Nov. 8, 1966  E. BRENNER ET AL  3,283,637
SALVAGE SAW APPARATUS

Filed Dec. 23, 1964  4 Sheets-Sheet 1

INVENTORS.
EWALD BRENNER &
EDWARD ERHART
BY
Edward C. Threldy
THEIR ATTORNEY.

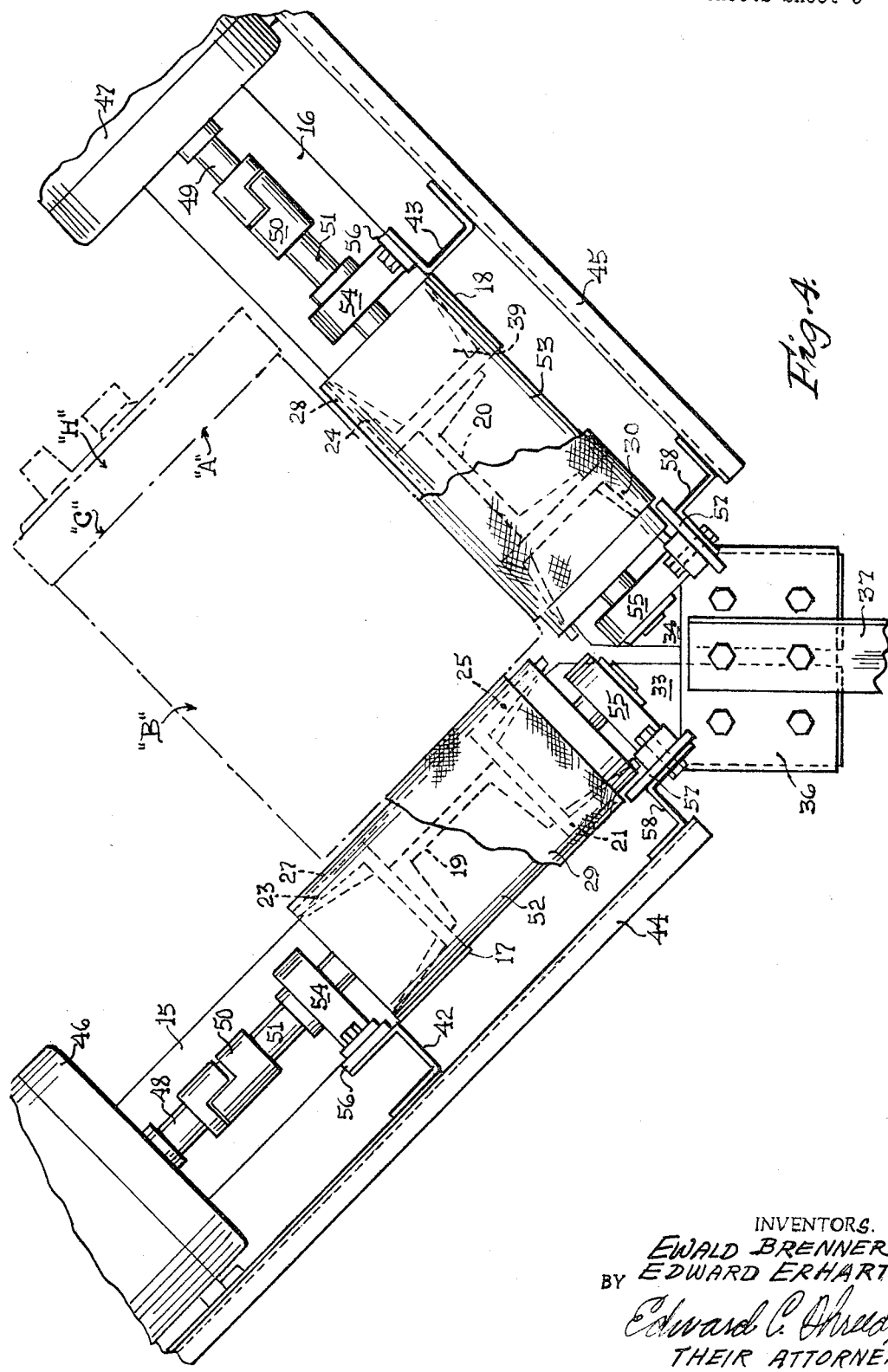

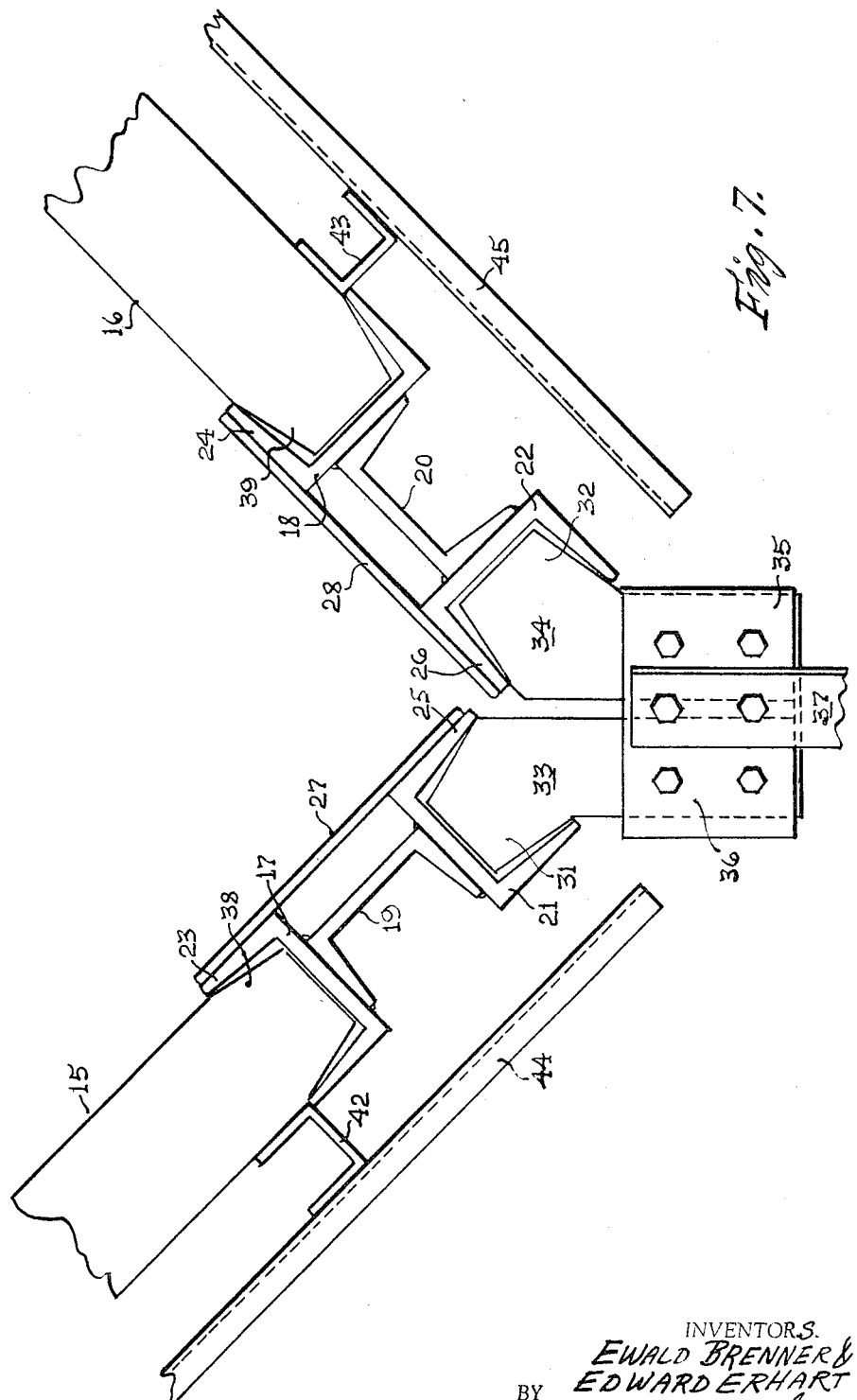

United States Patent Office 3,283,637
Patented Nov. 8, 1966

3,283,637
SALVAGE SAW APPARATUS
Ewald Brenner, Chicago, Ill. (614 S. Park Drive, Lombard, Ill.), and Edward Erhart, 10025 Charles, Chicago, Ill.
Filed Dec. 23, 1964, Ser. No. 420,599
2 Claims. (Cl. 83—432)

This invention relates to a salvage saw apparatus and more particularly to a storage battery salvage saw wherein the storage batteries are continuously fed to and through a sawing position.

The principal object of our invention is to provide a salvage saw apparatus wherein there is provided a means for continuously positioning and delivering a storage battery onto a continuous feed means presenting the head of the storage battery in a predetermined angular position with respect to a pair of cooperating saw blades whereby such head may be severed from the body thereof.

Another object of this invention is to provide in a salvage saw apparatus of this character a dual belt type conveyor for angularly receiving and moving a storage battery into and through a cutting position wherein a set of saw blades will sever the battery head permitting the same to drop by gravity after the cutting operation.

Yet another and equally important object of our invention is to provide a salvage saw apparatus of this character which may be readily adjusted to receive objects of different size and length so that the same may be readily salvaged.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 4 is a fragmentary side elevational detailed view of the mounting means for the drive roller assembly of our apparatus;

FIG. 7 is a fragmentary view of the adjusting means for the drive rollers as employed in our apparatus.

Figure 1:
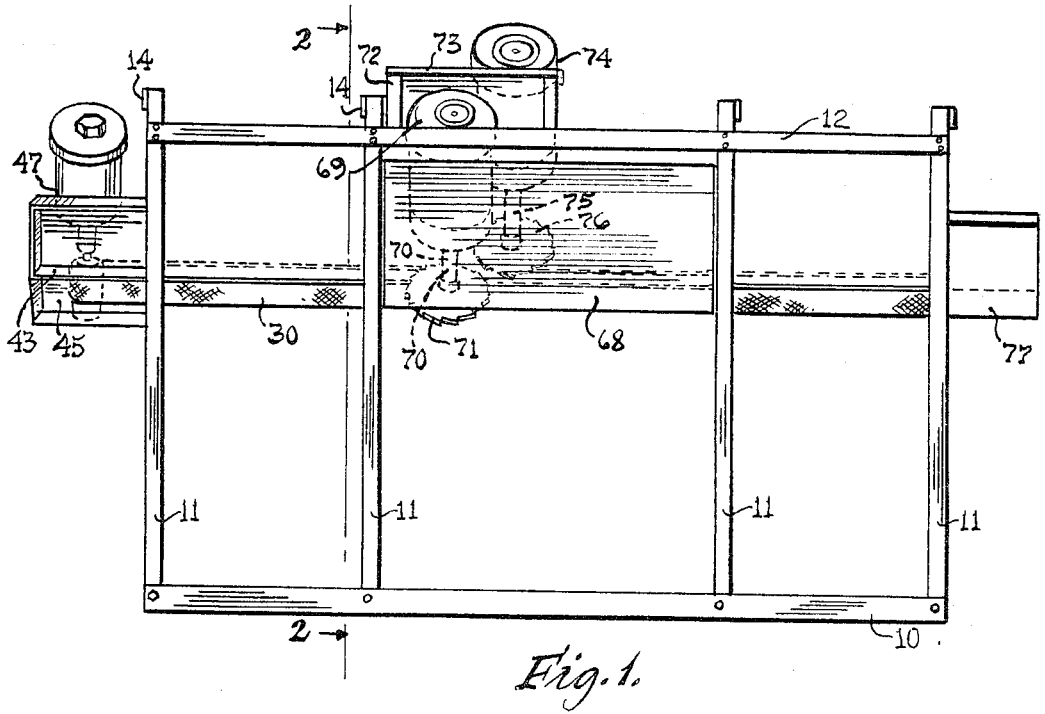
FIG. 1 is a side elevational view of our improved salvage saw apparatus.

Our salvage saw apparatus is primarily designed to salvage portions of storage batteries such as are used in automobiles and the like. The head portions of the batteries, as well as the lead plates therein, have a high commercial re-salvage value and it is the object of this invention to conveniently and simply remove the head portion of the battery so that it, as well as the lead plates therein, can be readily separated from the battery casing and salvaged.

To accomplish the various objects of our invention it is necessary to provide an apparatus which includes a cutting means which in the present illustration and preferred embodiment comprises a pair of cooperating circular saw blades. The salvage apparatus also requires a feed mechanism for presenting a storage battery to the cutting means in a manner whereby the head portion of the battery may or can be severed quickly and cleanly from the remaining portion of the battery casing. The present embodiment of our invention discloses a set of dual belt conveyors each having separate yet coordinated drive means for feeding a storage battery from the receiving end of the apparatus to and through a cutting position and then delivering the battery casing to a delivery end.

As shown in the drawings and constructed in a manner hereinafter described, the belt conveyors are angularly disposed with respect to each other, and with respect to a vertical axis of the apparatus, so that the battery positioned thereon is by its own weight maintained in a predetermined relation with respect to the cutting means.

As viewed in FIG. 1, our apparatus comprises a frame including a base member 10 supporting a plurality of vertical uprights 11 which adjacent their upper end are connected together by a horizontally extending supporting bar 12. Each of the uprights 11 is connected to a corersponding vertical upright 13 by a horizontally extending crossbar 14, as seen in FIG. 2.

Figure 2:
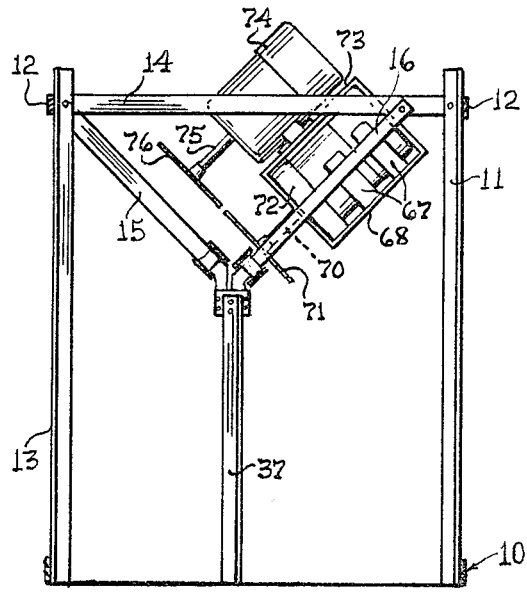
FIG. 2 is an elevational sectional view of our salvage saw apparatus taken on line 2—2 of FIG. 1.
Figure 5:
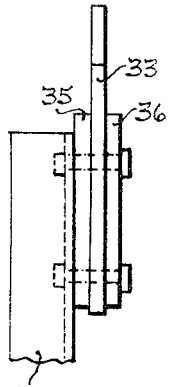
FIG. 5 is a detailed sectional view similar to FIG. 4 showing the connection between the supporting structures as employed in our apparatus.

Connected to each of the horizontal crossbars 14 is a pair of depending supports 15 and 16, (see FIGS. 2 and 4.) These depending supports 15 and 16 have their corresponding depending free ends spaced apart and projected into longitudinally extending channel-shaped rails 17 and 18 respectively, as hereinafter described. These rails 17 and 18 are connected by connecting rails 19 and 20 to a second set of longitudinally extending channel-shaped rails 21 and 22. As shown in FIGS. 4 and 5, the channel-shaped rails 17 and 18 are so positioned so as to have the open channel thereof in an opposite direction with respect to the open channel of the corresponding rails 21 and 22. Mounted on legs 23 and 24 of each of the channel-shaped rails 17 and 18 and on corresponding legs 25 and 26 of the rails 21 and 22 are flat guide plates 27 and 28. These guide plates 27 and 28 form the longitudinal base for the continuous rotating conveyor belts 29 and 30.

The conveyor belt guide plates 27 and 28 and their supporting structure are mounted on structural components that permit adjustment therebetween. As seen in FIGS. 4 and 7 each channel-shaped rail 21 and 22 receives the free ends 31 and 32 of a pair of angle bars 33 and 34. Those angle bars 33 and 34 are mounted between a pair of mounting plates 35 and 36. (See FIG. 5.) These mounting plates 35 and 36 are then connected to the upper end of a supporting standard 37.

The channel-shaped rails 17 and 18 in turn receive the free ends 38 and 39 of the angularly disposed depending suppports 15 and 16, it being understood that there are a pair of angularly disposed depending supports 15 and 16 carried by each of the horizontal crossbars 14 which extend between the vertical uprights 11. (See FIGS. 2 and 3.)

Figure 3:
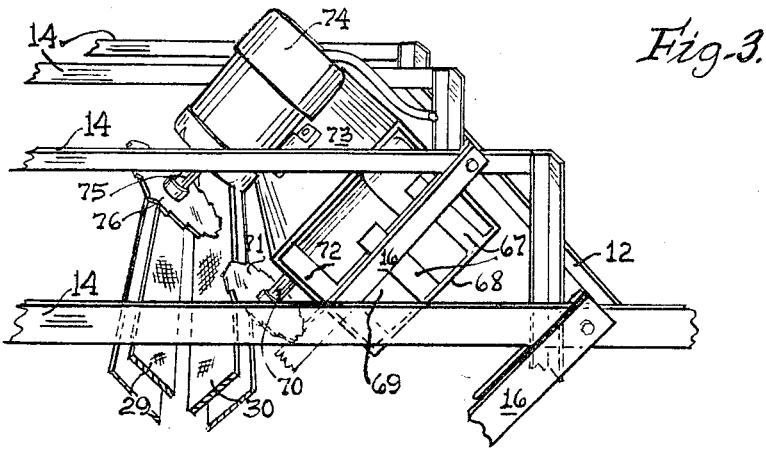
FIG. 3 is a fragmentary detailed view of the apparatus as seen from the receiving end thereof.
Figure 6:
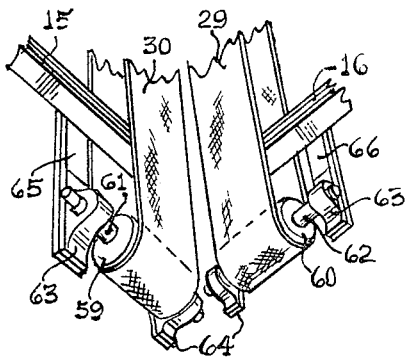
FIG. 6 is a fragmentary end view of our apparatus as seen from the delivery end thereof.

As clearly shown in FIGS. 2 and 3, the opposite ends of the depending supports 15 and 16 are connected to crossbars 14 in such a manner that they define the angle between the channel-shaped guide plates 27 and 28 (FIG. 7). Thus, any change in their angular mounting and a corresponding vertical adjustment of the connection between the mounting plates 35 relative to the supporting standard 47, will change the angle between the belt guide plates 27 and 28.

As shown in FIGS. 4 and 7, the depending supports 15 and 16 which comprise the endmost portion of the frame, each carry horizontally extending channel-shaped bars 42 and 43. These channel-shaped bars 42 and 43 each in turn supports a base 44 and 45 one of which is clearly shown in FIG. 1.

Adapted to be mounted on each of the bases 44 and 45 is an electric motor 46 and 47. Each of these motors is adapted to rotate a shaft 48 and 49 which includes a quick-disconnect coupling 50 which is in turn connected to and rotates a shaft 51 upon which is rotatably supported a drive roller 52 and 53.

As shown in FIG. 4, the shafts 51 of the rollers 52 and 53 are carried by suitable bearing brackets 54 and 55, the bearing brackets 55 being adjacent the free end of the shafts 51. Each of the bearing brackets 54 is connected to a slotted base 56 which is mounted on one arm of its respective channel-shaped supports 42 and 43. The bearing brackets 55 are mounted on slotted bases 57 which are carried by one end of a Z-shaped angle iron 58 connected to the bases 44 and 45. By this arrangement, the bearing brackets 54 and 55 may be adjusted longitudinally of the length of the conveyor belts 29 and 30 so as to maintain the proper tension thereon.

At the opposite end of the frame the conveyor belts 29 and 30 encircle rollers 59 and 60 which are each supported upon a shaft 61 and 62, the free ends of which are journalled in suitable bearing brackets 63 and 64 respectively. These bearing brackets 63 and 64 are supported upon the free ends of laterally extending angle irons 65 and 66 which are connected to the endmost depending supports 15 and 16, respectively.

By the foregoing, we have described a belt conveyor mechanism by which the article to be presented to the saw members may be moved horizontally from one end to the other of the frame structure.

Referring to FIG. 2, it is there shown that connected to the depending angle support 16 are a pair of mounting posts 67. These posts 67 in turn support an inclined wall 68 upon which is mounted an electric motor 69. As viewed in FIG. 1, it is seen that the wall 68 extends between the pair of middle upright supports 11 of the frame. The electric motor 69 includes a shaft 70 upon which is rotatably mounted a circular saw blade 71. Corner posts 72 extend upwardly from the wall 68 and support a shelf 73. Mounted upon the shelf 73 is a second electrical motor 74 which includes a shaft 75, which in turn rotates a second circular blade 76.

As shown in FIGS. 1 and 2, the positioning of the electric motors 69 and 74 is such that the circular saw blades 71 and 76 thereof are offset vertically and horizontally with respect to each other while overlapping through a horizontal line. By this arrangement an article to be salvaged as it is moved horizontally by the belt conveyors 29 and 30 will be first engaged by the circular saw blade 71 and be partially cut. As it is continued to be moved by the conveyor belts 29 and 30 it will engage the circular saw blade 76 and have a portion thereof completely severed from the remaining body.

While the preferred object of this apparatus is to salvage storage batteries by severing the heads therefrom and removing the lead plates from within, it follows that any use to which this apparatus may be put will come within the scope of this invention. As viewed in FIG. 4, a storage battery "B" is placed on the conveyor system of the apparatus at the left hand side as viewed in FIG. 1. This may be done by either an inclined chute or manually. As the conveyor belts 29 and 30 are disposed at a 90° angle with respect to each other and at a 45° angle with respect to the vertical axis of the frame, it is apparent that the battery will by its own weight be solidly positioned thereon both vertically and horizontally. As the conveyor belts rotate the battery will be moved so that it engages the lowermost and first circular blade 71 whereby an initial half cut (dotted line "A" FIG. 4) will be achieved. It should be noted at this point that the circular blades 71 and 76 are positioned so as to be parallel to the conveyor belt 29 and at a 90° angle with respect to the conveyor belt 30. Continuous movement of the battery by the conveyor plates will cause the same to engage the upper circular saw blade 76 and the remaining cut "C" will be achieved permitting the severed head portion "H" to fall by gravity off the conveyor system and into a suitable container, or second conveyor not shown.

The remaining portion of the battery "B" will continue past the sawing position of the apparatus until it reaches the right hand side of the apparatus as seen in FIG. 1 wherein it may pass onto a second conveyor system 77 as partially shown.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. A salvage saw apparatus comprising
   (a) a supporting frame,
   (b) a pair of elongated rails carried horizontally by said frame with the rails disposed at right angles with respect to each other and angularly with respect to the vertical axis of said frame, with the vortex of the angle open,
   (c) conveyor belts carried by said rails for moving an article from one end of said frame to the opposite end thereof,
   (d) motor means at one end of said rails for rotating said belts over said rails,
   (e) means carried by said frame intermediate its ends for supporting a pair of power saws above and to one side of said belts,
   (f) said power saws each including coplanar, horizontally offset, circular cutting blades extending parallel to one of said belts and perpendicularly to the other of said belts, with one of said cutting blades disposed to one side of and partially beneath said other of said belts,
   (g) said blades cooperating to successively cut through a portion of an article conveyed over said frame by said conveyor belts to sever a part therefrom so that it may freely fall from said conveyor belts while the remainder is carried by said belts to said opposite end of said frame.

2. A salvage saw apparatus as defined by claim 2 including means for adjustably connecting said rails to said frame for varying the angles therebetween so as to vary the angle of cutting engagement of said blades with an article conveyed through said frame by said conveyor belts.

References Cited by the Examiner
UNITED STATES PATENTS

| | | | |
|---|---|---|---|
| 2,398,275 | 4/1946 | Alpert | 136—174 |
| 2,684,088 | 7/1954 | Miller | 143—38 |
| 2,821,220 | 1/1958 | Nicholson | 143—49 |

FOREIGN PATENTS

| | | |
|---|---|---|
| 517,075 | 2/1953 | Belgium. |

WILLIAM S. LAWSON, *Primary Examiner.*

L. B. TAYLOR, *Assistant Examiner.*